US012657422B2

(12) United States Patent
Nieland

(10) Patent No.: US 12,657,422 B2
(45) Date of Patent: Jun. 16, 2026

(54) DUAL INTERFACE ELECTRONIC MODULE WITH VALUE-ADD COMPONENT AND MANUFACTURING METHOD THEREOF

(71) Applicant: LINXENS HOLDING, Mantes la Jolie (FR)

(72) Inventor: Carsten Nieland, Dresden (DE)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 18/699,820

(22) PCT Filed: Nov. 18, 2021

(86) PCT No.: PCT/IB2021/000789
§ 371 (c)(1),
(2) Date: Apr. 9, 2024

(87) PCT Pub. No.: WO2023/089349
PCT Pub. Date: May 25, 2023

(65) Prior Publication Data
US 2024/0412027 A1 Dec. 12, 2024

(51) Int. Cl.
*G06K 19/06* (2006.01)
*B32B 37/12* (2006.01)
*G06K 19/077* (2006.01)

(52) U.S. Cl.
CPC .... *G06K 19/07747* (2013.01); *B32B 37/1207* (2013.01); *G06K 19/07707* (2013.01);
(Continued)

(58) Field of Classification Search
CPC ....... G06K 19/07769; G06K 19/07749; G06K 19/077; G06K 19/07; G06K 19/07747;
(Continued)

(56) References Cited

U.S. PATENT DOCUMENTS

| | | | |
|---|---|---|---|
| 2012/0038445 A1 | 2/2012 | Finn | |
| 2015/0294213 A1* | 10/2015 | Ziemkus | ............. H01L 23/3121 |
| | | | 257/679 |

(Continued)

FOREIGN PATENT DOCUMENTS

| | | |
|---|---|---|
| DE | 10 2007 058547 A1 | 6/2009 |
| DE | 10 2014 107299 A1 | 11/2015 |
| EP | 3 168 787 A1 | 5/2017 |

OTHER PUBLICATIONS

International Search Report and Written Opinion of the International Searching Authority for related International Application No. PCT/IB2021/000789, dated Jun. 27, 2022, 12 pages.

*Primary Examiner* — Daniel St Cyr
(74) *Attorney, Agent, or Firm* — DITTHAVONG, STEINER & MLOTKOWSKI

(57) ABSTRACT

The present invention refers to a dual interface electronic module for a smart card and to the fabrication method thereof. The dual interface electronic module comprises a contact plate for external connection, which includes at least one antenna electrical connector, and a multilayered PCB including a value-add component, for instance a display. The contact plate and the multilayered PCB are connected together by means of a plurality of interconnects at an interconnection interface; the contact plate has a first area in correspondence of the interconnection interface and the multilayered PCB has a second area in correspondence of the interconnection interface. The first area is larger than the second area, so as to define an excess portion and at least one portion of the at least one antenna electrical connector is placed on the excess portion so as to be exposed for being electrically connected to a corresponding antenna of the smart card. The present invention also refers to the smart card comprising such a dual interface electronic module and to the fabrication method thereof.

15 Claims, 5 Drawing Sheets

(52) U.S. Cl.
CPC . *G06K 19/07722* (2013.01); *G06K 19/07773*
(2013.01); *B32B 2425/00* (2013.01)

(58) Field of Classification Search
CPC ......... G06K 19/07773; G06K 19/0772; G06K
19/07722; G06K 19/07743; B32B
2425/00; B32B 37/1207
USPC ................................................ 235/492, 487
See application file for complete search history.

(56)                       References Cited

U.S. PATENT DOCUMENTS

2019/0012588  A1*    1/2019  Lalo .................... H01L 21/4853
2019/0355693  A1*   11/2019  Zenz ................ G06K 19/07769
2021/0117526  A1*    4/2021  Lisk ...................... G07F 7/0826

* cited by examiner

DUAL INTERFACE ELECTRONIC MODULE WITH VALUE-ADD COMPONENT AND MANUFACTURING METHOD THEREOF

FIELD OF THE INVENTION

The invention relates to a dual interface electronic module with a value-add component, for instance a display, for integration into a smart card and to a smart card with such a dual interface electronic module. Furthermore, the invention refers to a method of manufacturing a smart card with such a dual interface module.

STATE OF THE ART

Smart cards are increasingly used in the everyday life as payment cards, SIM cards for mobile phones, transport cards, identity cards and the like. There is a strong effort to integrate an increasing number of functions into a smart card for making smart cards more versatile in the application of everyday life. Accordingly, there is a constant need to improve electronic packaging techniques, that is packaging of the integrated circuit chips or dies.

Typically, a smart card includes transmission means for transmitting data from a chip of the smart card to a card reader device or vice versa. The transmission means can be a contact interface in which a direct electrical contact to an external contact element of the smart card is established and a card reader is able to communicate with the chip of the smart card via a direct electrical contact. Another way of communicating with a chip of the smart card is in a contactless manner by a contactless interface, using an antenna integrated into the smart card, allowing to communicate with the chip of the smart card in a contactless manner.

In a plurality of current card designs, a double interface is provided for not only allowing contactless communication with a chip of a smart card, but also providing an electric contact for directly contacting the chip of the smart card, such as an external contact provided in a card body of a smart card for directly coupling the smart card with a card reader device in a contact manner. Such a double interface transmission means is generally referred to as "dual" in case that a contact mode and a contactless mode are managed by a single chip of the smart card.

Typically, a dual interface (DIF) smart card consists of a rigid plastic support such as PVC, PVC/ABS, PET or polycarbonate, constituting a card body of the smart card into which one or more printed circuits are incorporated.

According to a method disclosed in the patent application WO 2021/206780, a packaged electronic module may be produced, which comprises all the electronic components, including a contact plate for external connection, a value-add component and the antenna electrical connectors, in a single module. This module can then be embedded into a plastic card, by using standard milling techniques, by a card manufacturer and the module may be further connected to the antenna. This method presents several limitations, essentially due to the fact that the antenna electrical connectors are placed on the same layer of the display PCB.

Therefore, there is a need for an efficient dual interface electronic module and a manufacturing method thereof.

BRIEF SUMMARY OF THE DISCLOSURE

According to a first aspect of the present invention, a dual interface electronic module for a smart card is provided, the dual interface electronic module comprising a contact plate for external connection, said contact plate including at least one antenna electrical connector, and a multilayered PCB including a value-add component, for instance a display; wherein the contact plate and the multilayered PCB are connected together by means of a plurality of interconnects in correspondence of an interconnection interface and wherein the contact plate has a first area in correspondence of the interconnection interface and the multilayered PCB has a second area in correspondence of the interconnection interface. The dual interface electronic module is characterized in that, the first area is larger than the second area, so as to define an excess portion and at least a portion of the at least one antenna electrical connector is placed on the excess portion so as to be exposed for being electrically connected to a corresponding antenna of the smart card.

The advantage of this configuration is that the at least one antenna electrical connector is placed on an exposed portion of the contact plate and it can be easily connected to a corresponding antenna, for instance an antenna of a smart-card. Moreover, it is easier to connect the interconnects between the contact plate and the multilayer PCB in order to form the dual interface electronic module and, at the same time, ensure a correct positioning of the antenna pads and a reliable connection to the antenna electrical connectors. In fact, it is possible to check the correct positioning of the antenna electrical connectors even after the assembly of the dual interface electrical module and it is possible to adjust their position according to the needs, because the antenna electrical connectors are located on a contact plate having a larger area with respect to standard contact plates. Therefore, in this configuration, despite the non-idealities of the tools used to form the dual interface electronic module (e.g. the deviations from the nominal positions), the antenna electrical connectors may be correctly positioned on the contact plane and they can be reliably connected to the corresponding terminals of the antenna.

Furthermore, since the at least one antenna electrical connector is placed on a layer of the dual interface electronic module which is close to the part exposed to external devices for contact mode operation, an optimal functioning of the electronic module is ensured.

The contact plate may be a multilayered structure comprising a layer of metal contact pads and a layer of metal electrical connectors (e.g. pins) bound together by means of an epoxy glass layer. In the present disclosure, it has to be understood that the contact plate may have the shape of a plane having a first area, defined by a first width and a first length.

The multilayered PCB may be a multilayered structure comprising for instance four layers of PCBs bound together by means of three layers of epoxy glass. However, it is clear that the multilayered PCB may also comprise a different (i.e. bigger or smaller) number of layers.

In the present disclosure, it has to be understood that the multilayered PCB may comprise a main surface (corresponding to the surface of a single PCB) having a second area, defined by a second width and a second length.

The antenna electrical connector may comprise an antenna electrical pad. Preferably, at least a portion of the antenna pad may be placed on the excess portion of the contact plate, so as to be exposed for being electrically connected to a corresponding antenna of the smart card. Even more preferably, the entire antenna pad may be placed on the excess portion of the contact plate, so as to be exposed for being electrically connected to a corresponding antenna of the smart card.

The first area of the contact plane is larger than the second area of the multilayered PCB, since at least one of the first length and/or the first width exceeds the second width and/or second length, respectively. Therefore, an excess portion is defined in the dual interface electronic module, that is an excess portion corresponding to the difference between the first area of the contact plate and the second area of the multilayered PCB. The excess portion hence corresponds to the portion of the contact plate protruding from the multi-layered PCB in at least one direction of the PCB.

The at least one antenna electrical connector is placed on the excess portion, in the back side of the contact plate. The back side of the contact plate is the side that is intercon-nected to the multilayered PCB and that is opposed to the front side of the contact plate, which is exposed to the user.

The interconnection interface may be a plane defined in the region of the dual interconnection electronic module wherein the multilayered PCB is interconnected to the contact plate by means of a plurality of corresponding electrical connectors or interconnects.

Preferably, two antenna electrical connectors are provided and they are placed on the excess portion, symmetrically with respect to an axis of the first area of the contact plate. For instance, the two antenna electrical connectors may be connected to the antenna terminals of the card by means of a wire pad connection, a metal pad connection, and/or a portion of full metal antenna conductor line (e.g. copper of a first layer of a flex comprised into the card and/or a printed conductive ink pad).

According to a preferred configuration, the value-add component of the multilayered PCB may be a display, for instance a display for a Dynamic Card Verification Value (DCVV). For instance, the display may be a bistable LCD display. Alternatively, the value add component may com-prise a fingerprint sensor, a LED, an electronic or mechani-cal button.

According to a further embodiment of the present inven-tion, a dual interface electronic module is provided, wherein the first area has a first width and a first length and the second area has a second width and a second length and at least one of the following conditions is satisfied: the first width is greater than the second width, and/or the first length is greater than the second length, so as to define the excess portion.

The advantage of this configuration is that the first area is larger than the second area so as to define an excess portion on the perimeter of the contact plate. Therefore, the at least one antenna electrical connector may be placed on the excess portion and may be exposed to the outside of the dual interface electronic module so as to be electrically connected to a corresponding antenna, for instance an antenna of a smartcard. Moreover, the at least one antenna electrical connector may be clearly visible on the side of the contact plane in correspondence of the interconnection interface and its position can be checked and adjusted so as to correspond to the desired position for being connected to an antenna. In fact, due to the intrinsic experimental error of each tool used to form the dual interface electronic module, it is currently difficult at the state of the art to ensure a correct positioning of the antenna electrical connectors and accordingly a reli-able connection to the antenna. Accordingly, the resulting dual interface electronic module may be damaged and may not work properly. These limitations are overcome by the present invention.

According to a preferred configuration, the first area comprising a first width and a first length is larger than the second area comprising a second width and a second length because the first width is greater than the second width and the first length is greater than the second length. Preferably, the contact plate is symmetrically disposed on the multilayer PCB, so that the excess portion is symmetrically distributed around the multilayer PCB. In this way, the one or more antenna electrical connectors may be symmetrically placed on the excess portion. In this way, the cross section of the dual interface electronic module preferably has a T-shape profile, wherein the cross-section of the protruding excess portion of the contact plate may form the two arms of the "T".

According to a further embodiment of the present inven-tion, a dual interface electronic module is provided, wherein the contact plate comprises two or four antenna electrical connectors, which are symmetrically distributed on the excess portion.

The advantage of this configuration is that it provides a symmetric positioning of the antenna electrical connectors on the excess portion of the contact plate and that it simplifies the process for connecting them to the corre-sponding antenna terminals.

Preferably, the two antenna electrical connectors are sym-metrically arranged with respect to an axis of the first area of the contact plate. Preferably, the four antenna electrical connectors are symmetrically arranged with respect to one or two axes of the first area of the contact plate.

According to a further embodiment of the present inven-tion, the contact plate may include four antenna electrical connectors that are symmetrically arranged on the contact plate. Preferably, a first couple of two antenna electrical connectors is configured to connect the electronic module to a first antenna of the smart card for contactless mode operation of the card. Preferably, a second couple of two antenna electrical connectors is configured to connect the electronic module to a second antenna, which may be comprised into the card for additional energy harvesting from the contactless field. i.e. to provide additional power to the functional elements (e.g. display driver chip, micro-controller, display). Preferably, the second couple of two antenna electrical connectors may also to be connected to a button comprised in the card to switch on the display of the dual interface module.

According to a further embodiment of the present inven-tion, a dual interface electronic module is provided, wherein the contact plate conforms to the specifications of an ISO 7816 contact plate.

The advantage of this configuration is that the dual interface electronic module may be employed in all the electrical appliances that need to conform to the specifica-tion of the ISO 7816. Preferably, the ISO contact plate comprises five pins distributed on the back surface of the contact plane in correspondence of the interconnection inter-face. Preferably, the excess portion is symmetrically distrib-uted with respect to the multilayer PCB and the two antenna electrical connectors are disposed at opposite sides of the ISO pins of the contact plate.

According to an alternative embodiment, the contact plate may conform to other standards other than the ISO 7816 standards.

According to a further embodiment of the present inven-tion, a dual interface smart card is provided, the dual interface smart card comprising a card body including an antenna, and a dual interface electronic module as the ones described above, wherein the card body comprises a cavity for accommodating the dual interface electronic module and the cavity has a cross-section configured to match the cross-section of the dual interface electronic module, so as to accommodate the contact plate protruding from the multilayered PCB, and wherein the antenna is electrically connected to the at least one antenna electrical connector.

The advantage of this configuration is that the dual interface electronic module may be easily assembled into the card body and a more precise positioning of the antenna electrical connectors may be obtained, in order to ensure a more reliable interconnection to the antenna thanks to the larger overlapping area of the terminals to each other. This configuration may ensure a reliable connection between the antenna connectors of the dual interface electronic module and the antenna terminals of the antenna of the card body, while still ensuring a reliable connection between the contact plate and the multilayered PCB. To the contrary, at the state of the art, it is difficult to ensure a reliable connection between the antenna connector and the antenna of the card and, at the same time, a reliable connection between contact plate and multilayered PCB. In fact, the tools used in the production process have some non-idealities and therefore it is difficult to simultaneously ensure precise positioning of the antenna electrical connectors in the module and of the contact plate in the card, especially because the contact plate is usually employed as reference for positioning of the module in the card in order to provide correct positioning with respect to external electrical devices during usage.

For example, the smartcard may be a smartcard provided with a Dynamic Card Verification Value (DCVV) and the display of the dual interface electronic module may be used to read out the DCVV.

According to a preferred configuration, the cavity milled in the card body may have a T-shaped cross-section, matching the cross-section of the dual interface electronic module that is inserted into the cavity. In this way, the cavity may comprise an upper cavity accommodating the contact plate protruding from the multilayer PCB and a lower cavity accommodating the multilayered PCB, wherein the lower cavity is milled within the upper cavity. The upper cavity has a depth, a width and a length suitable for accommodating the contact plate covered by a layer of adhesive material. Accordingly, the lower cavity has a depth, a width and a length suitable for accommodating the multilayered PCB covered by a layer of adhesive material. Preferably, the back side of the multilayered PCB is designed to be substantially flat, so as to be easily inserted into the lower cavity having a substantially flat bottom side.

Preferably, the cavity may be a blind hole cavity milled in the card body, so that part of the material of the card body covers the dual interface electronic module from the backside.

According to a further embodiment, the cavity of the smart card body may comprise one or more sub-cavities, in order to accommodate the display and the other electrical components protruding from the bottom layer of the multilayered PCB. Preferably, the depth of the one or more sub-cavities may be adapted to the heights of the different components.

The dual interface electronic module is preferably pre-assembled and it is inserted into the milled cavity of the card body of the smartcard in a single step during the formation process of the smartcard. Preferably, the dual interface electronic module may be pre-glued within a layer of adhesive material before being inserted in the cavity of the card body.

According to a preferred configuration, two different adhesive materials may be used to cover the dual interface electronic module and they may be adapted to the different physical properties of the components of the dual interface electronic module. For instance, the contact plate of the dual interface electronic module may be partially covered with a hot melt film or an ACF material in order to fix the module into the card cavity and to provide an electrical interconnection with the card terminals.

For instance, the multilayered PCB may be covered with a second adhesive material, which is configured to provide a physical and/or an optical interconnection of the display surface with the bottom of the deeper card cavity. For instance, the second adhesive may be transparent in order to ensure that the display digits are visible through the remaining material of the card body. Due to the milling operations, the surface of the bottom of the lower cavity usually has a rough surface and it is not fully transparent. Accordingly, the second adhesive material may be configured to penetrate into the surface roughness and to make it optically clear and/or transparent, for instance by forming an optical bridge to the display surface. For instance, the second adhesive may be further configured to fix the module to the card body.

According to a further embodiment of the present invention, a dual interface smart card is provided, wherein the excess portion of the dual interface electronic module comprises a protruding, flat surface to be accommodated into the cavity having a T-shaped cross-section.

The advantage of this configuration is that the excess portion has a substantially flat surface, which does not comprise any components significantly protruding from it. When milling the cavity of the card body, therefore, there is no need to mill a cavity having a complex cross-section to match the cross-section of the dual interface electronic module, because the dual interface electronic module simply has a T-shaped cross section. Therefore, the process of assembling the smartcard is made faster, simpler and more efficient.

According to a further embodiment of the present invention, a dual interface smart card is provided, wherein the dual interface electronic module is at least partially encapsulated within a first adhesive material having conductive properties, for instance an Anisotropic Film Connection (ACF) material, for electrically connecting the antenna and the at least one antenna electrical connector.

The advantage of this configuration is that the dual interface electronic module may be at least partially covered by a first adhesive material having conductive properties, in order to electrically connect the at least one antenna electrical connector to the antenna of the smartcard, while encapsulating and protecting the dual interface electronic module. Moreover, the first adhesive material may advantageously fix the contact plate in the cavity of the smart card.

Preferably, the dual interface electronic module is covered by the first adhesive material so as to encapsulate only the contact plate.

According to a preferred configuration, an ACF material is provided as a first adhesive material. The ACF material may be advantageously employed to hold the dual interface electronic module in the correct position within the cavity and also to provide an electronic connection between the at least one antenna electrical connector and the antenna formed in the smart card. The advantage of the ACF material is that it comprises conductive particles embedded in a resin and it can bond the integrated circuit and the other electrical component of the dual interface electronic module and conduct electricity, while simultaneously insulating adjacent terminals to prevent shortcuts.

According to a preferred configuration, the first adhesive material may be a hot melt material. Since the antenna electrical connectors are located on the contact plate forming the top of the dual interface electrical module, there is no need to apply a large amount of thermal energy to hot melt the first adhesive material, because path that the heat flow must cover to reach the hot melt material is reduced compared to the configurations at the state of the art. To the contrary, if the antenna electrical connectors were place on lower layers of the dual interface electrical module (e.g. at the bottom of the multilayered PCB, as disclosed in the state of the art), it would be necessary to apply a large amount of thermal energy in order to hot melt the adhesive material, because the heat flow would have to traverse the whole module before reaching the antenna electrical connectors.

According to alternative configurations, the antenna of the smart card may be electrically connected to the antenna electrical connectors by means of TE-connect, conductive glue, solder, flex bump.

According to a further embodiment of the present invention, a dual interface smart card is provided, wherein the dual interface electronic module is at least partially covered by a second adhesive material for connecting the value-add component, for instance a display, and the card body, and the second adhesive material is transparent, so that the value-add component is visible from at least one side of the smart card.

The advantage of this configuration is that a second adhesive material may be employed for covering the multilayered PCB. The second adhesive material may be advantageously selected to be optically transparent, in order to allow to view the value add component, for instance a display, from the bottom side of the smartcard. In this way, the optical functionality of the smart card is ensured. For instance, it may be possible to read out the display from the bottom of the card.

Preferably, the dual interface electronic module is covered by the second adhesive material so as to cover only the multilayered PCB. Preferably, the second adhesive material is different from the first adhesive material.

For example, the second adhesive material may be a resin material not having conductive properties. In fact, there is no need to electrically connect the multilayered PCB to other electrical components provided in the card, since the multilayered PCB is already connected to the contact plate by means of the interconnects.

According to another aspect of the present invention, a method for fabricating a dual interface electronic module with a value-add component for a smart card is provided, the method comprising the following steps:

Providing a contact plate for external connection;

Providing a multilayered PCB including a value-add component, for instance a display;

Connecting the contact plate and the multilayered PCB in correspondence of an interconnection interface by means of a plurality of interconnects, wherein the contact plate has a first area in correspondence of the interconnection interface and the multilayered PCB has a second area in correspondence of the interconnection interface.

The method is characterized in that, the first area is larger than the second area, so as to define an excess portion and at least a portion of at least one antenna electrical connector is provided on the excess portion so as to be exposed for being electrically connected to a corresponding antenna of the smart card.

The advantage of this solution is that it provides a method for pre-assembling and forming a dual interface electronic module, wherein the at least one antenna electrical connector is located on the excess portion of the contact plate, protruding from the multilayered PCB, and is exposed for being electrically connected to a corresponding antenna, for instance an antenna of a smartcard. Thanks to the fact that the antenna electrical connector is placed on the excess portion of the contact plate, it is possible to check and adjust the position of the antenna electrical connector and to ensure a reliable connected with the corresponding antenna terminal. Furthermore, since the at least one antenna electrical connector is placed on a layer of the dual interface electronic module which is close to the part exposed to external devices for contact mode operation, an optimal functioning of the electronic module is ensured.

According to a further embodiment of the present invention, the method above comprises providing the contact plate having the first area with a first width and a first length, and providing the multilayered PCB having the second area with a second width and a second length, wherein at least one of the following conditions is satisfied: the first width is greater than the second width, and/or the first length is greater than the second length, so as to define the excess portion.

The advantage of this configuration is that the first area of the contact plate is larger than the second area of the multilayered PCB so as to define an excess portion, protruding from the multilayered PCB in correspondence with the interconnection interface. The excess portion may be advantageously designed so as to offer enough place for locating the antenna electrical connectors and for ensuring a correct connection to an antenna.

Preferably, the first area is larger than the second area in that the first width of the first area is greater than the second width of the second area and the first length of the first area is greater than the second length of the second area. Therefore, the dual interface electronic module preferably has a T-shaped cross section, wherein the contact plate protrudes from all sides of the multilayered PCB.

According to a further embodiment of the present invention, a method is provided, wherein the method comprises a reel-to-reel process, wherein a plurality of contact plates are formed on a first tape and a plurality of multilayered PCBs are formed on a sheet, the plurality of multilayered PCBs are cut out from the sheet so as to obtain a plurality of single PCBs and the single PCBs are mounted and electrically coupled to the plurality of corresponding contact plates on the first tape, so as to form a second tape including a plurality of corresponding dual interface electronic modules.

The advantage of the solution is that it provides a method for assembling the dual interface electronic module in a fast and efficient way.

Preferably, a first tape containing a plurality of contact plates is provided. A sheet comprising a plurality of multilayered PCBs is further provided. The multilayered PCBs are cut out from the sheet so as to obtain a plurality of single PCBs. The single PCBs are then transferred on the first tape in a discrete way with a "pick and place" solution and they are assembled with the corresponding contact plates of the first tape, so as to form corresponding dual interface electronic modules. The assembled product forms a reel-to-reel second tape, wherein the first tape acts as a carrier tape. Since the contact plate according to the present embodiment protrudes from the surface of the multilayered PCB, during the step of punching out the so-formed electronic modules, there is no risk to damage the multilayered PCB and the related integrated circuits. In fact, the tools for punching out the contact plate may be applied only on the contact plate, without touching the multilayered PCB.

The term "tape" indicates a flexible substrate having a width and a length and being wound/unwound on a reel.

According to a further embodiment of the present invention, a method is provided, wherein the method comprises a reel-to-reel process, wherein a plurality of contact plates are formed on a first tape and a plurality of multilayered PCBs are formed on a third tape, wherein the first tape is aligned and electrically coupled to the third tape so as to form a fourth tape including a plurality of corresponding dual interface electronic modules.

The advantage of the solution is that it provides a method for assembling the dual interface electronic module in a fast and efficient way. Preferably, in a reel-to-reel process, a first tape containing a plurality of contact plates may be aligned and electrically coupled to a third tape containing a plurality of multilayered PCBs. The alignment of the two tapes ensures that the contact plates are aligned with the corresponding multilayered PCB and that they can be mechanically and electrically coupled.

According to a further embodiment of the present invention, a method for fabricating a dual interface smart card is provided, the method comprising the following steps:

Fabricating a dual interface electronic module according to one of the methods disclosed above;

Providing a card body of a smart card comprising a cavity and an antenna, the cavity having a cross-section configured to match the cross-section of the dual interface electronic module, so as to accommodate the contact plate protruding from the multilayered PCB;

Inserting the dual interface electronic module into the cavity; and

Electrically connecting the antenna to the at least one portion of the at least one antenna electrical connector.

The advantage of the solution is that it provides a method for fabricating a dual interface smart card in an efficient way. The present solution ensures the correct positioning of the contact pads and the electrical interconnects of the module in the smart card, while simultaneously ensuring a reliable electrical connection between the antenna electrical connectors and the corresponding terminals of the antenna of the smart card. This is possible because the position of the antenna electrical connectors is independent from the position of the other electrical connectors of the contact plate, since the contact plate is larger than in standard configurations and may easily accommodate all the electrical components.

Preferably, the cavity may be milled so as to have a cross-section configured to match the cross-section of the dual interface electronic module, for instance a T-shaped profile matching the cross-section of the dual interface electronic module that is inserted in the cavity. In this way, the protruding part of the contact plate forming the excess portion may be inserted into a first cavity having a depth corresponding to the depth of the contact plate and the multilayered PCB may be inserted into a second cavity having a depth corresponding to the depth of the multilayered PCB. Preferably, a third or a fourth cavity may be milled within the second cavity so as to accommodate any electrical component, such as a value-add component, for instance a display, protruding from the main body of the multilayered PCB, wherein the depths of the third or fourth cavity corresponds to the heights of the protruding electrical components.

Preferably, the cavity may be a blind hole cavity milled in the card body, so that part of the material of the card body covers the dual interface electronic module from the backside.

According to a further embodiment of the present invention, a method is provided, wherein the method further comprises the step of providing the dual interface electronic module with a first adhesive material having conductive properties, for instance an Anisotropic Connection Film (ACF) material, for electrically connecting the at least one portion of the at least one antenna electrical connector to the antenna.

The advantage of this solution is that the dual interface electronic module may be covered by a first adhesive material having conductive properties, while can simultaneously hold the dual interface electronic module in the cavity of the smart card and also electrically connection the antenna electrical connectors and the antenna of the smart card.

Moreover, since the first adhesive is generally a hot melt film, this configuration of the dual interface electronic module has the advantage that the antenna electrical connectors are placed close to the opening of the cavity, a where the thermal energy is applied; therefore, there is no need to apply a large amount of thermal energy to connect the antenna, because the heat flow only travels along a short distance. Accordingly, the risk of damaging the other electrical components of the dual interface electronic module while hot melting the first adhesive material is reduced.

For instance, an ACF material may be employed to cover the dual interface electronic module. In this way, the resin of the matrix of the ACF may ensure positioning of the electronic module, while the conductive particles of the ACF may ensure the electrical connection between the antenna connectors and the antenna of the smart card.

According to a preferred configuration, the ACF may be used for covering the contact plate of the dual interface electronic module. The surface of the contact plate in correspondence of the antenna connectors may advantageously be flat, in order to ensure superior adhesion of the ACF film.

According to a further embodiment of the present invention, a method is provided, wherein the method further comprises the step of providing the dual interface electronic module with a second adhesive material, the second material being transparent for allowing to view the value-add component from at least one side of the smart card through the second adhesive material.

The advantage of this configuration is that the second adhesive material for covering the dual interface electronic component may be selected to be optically transparent. In this way, the value add component, for instance, the display, placed at the bottom of the electronic module may be visible from the bottom of the smart card. For example, the display may be easily read out from the bottom of the smart card.

According to a preferred configuration, the second adhesive material may be used to cover only the bottom part of the dual interface electronic module, i.e. the multilayered PCB comprising the display. Preferably, the second adhesive material may not have any electrical conductivity properties, in order to save production costs. In fact, there is no need to provide electrical connection between the multilayered PCB and the other electrical components of the smart card, since the multilayered PCB is already connected to the contact plate by means of the interconnects.

The display of the dual interface electronic module may be also visible from other sides of the smart card, according to the specific needs.

According to illustrative and not limiting embodiments, the second adhesive material may comprise one of the following options:

A transparent epoxy (chemical binding/reacting) paste applied onto the dual interface electronic module or directly into the card cavity, before implanting same;

A pressure sensitive paste applied onto the dual interface electronic module or directly into the card cavity, before implanting same;

An adhesive film on PU or PE base or similar which deforms at low temperature;

An EVA based (or EVA-PE or similar mix) adhesive paste or film (transparent) applied onto the dual interface electronic module or directly into the card cavity, before implanting same;

Cyanoacrylate applied into the card cavity before implanting the electronic module;

Adhesive films or pastes to be applied into the card cavity or onto the electronic module, the adhesive films or pastes being activated by light or UV or other radiation/photonic energy (e.g. IR).

According to an alternative embodiment, a transparent material may be employed, wherein the transparent material does not provide adhesion properties during and after module implanting, but, during implanting, can be formed and "flows" into recesses and in to surface roughness in order to provide optical interconnection; forming due to applying pressure onto the material (implanting pressure)

According to a further embodiment of the present invention, a method is provided, the method further comprising the step of providing the dual interface electronic module with a third adhesive material not having conductive properties, wherein the first adhesive material is configured to cover the at least one antenna electrical connector and the third adhesive material is configured to cover the remaining part of the excess portion and is provided with openings in correspondence of the at least one antenna electrical connector covered by the first adhesive material.

The advantage of this solution is to reduce costs, because the first adhesive material having conductive properties, which is more expensive, is used only in correspondence of the antenna electrical connectors. The stable attachment of the dual interface electronic module to the card body is still ensured by the third adhesive film.

For example, the third adhesive material may comprise a hot melt film layer, which is cut so as to have openings in correspondence of the area of the antenna electrical connectors. In this way, the area of the antenna electrical connectors may be covered with a conductive material, such as ACF material, Flex bumps, conductive glue and/or reflowed solder, and the electrical connection between the antenna electrical connectors and the antenna may be obtained.

According to illustrative and not limiting embodiments, the third adhesive material may comprise one of the following options:

A transparent epoxy (chemical binding/reacting) paste applied onto the dual interface electronic module or directly into the card cavity, before implanting same;

A pressure sensitive paste applied onto the dual interface electronic module or directly into the card cavity, before implanting same;

An adhesive film on PU or PE base or similar which deforms at low temperature;

An EVA based (or EVA-PE or similar mix) adhesive paste or film (transparent) applied onto the dual interface electronic module or directly into the card cavity, before implanting same;

Cyanoacrylate applied into the card cavity before implanting the electronic module;

Adhesive films or pastes to be applied into the card cavity or onto the electronic module, the adhesive films or pastes being activated by light or UV or other radiation/photonic energy (e.g. IR).

According to a further embodiment of the present invention, a method is provided, wherein said third adhesive material is further configured to cover the exposed portion of the multilayered PCB.

The advantage of this solution is to reduce costs, because the first adhesive material having conductive properties and hence being more expensive, is used only in correspondence of the antenna electrical connectors.

The third adhesive material may be advantageously employed to cover the external surface of the module which must be fixed to the cavity, i.e. the excess portion of the contact plate (except for the antenna electrical connectors) and the exposed portion of the PCB. The exposed portion of the PCB indicates the portion of the PCB not being connected to the contact plate and being in contact with the surface of the cavity. The stable attachment of the dual interface electronic module to the card body is still ensured by the third adhesive film.

Preferably, the third adhesive material may be transparent, in order to make the value-add component (e.g. the display) visible on the back side.

BRIEF DESCRIPTION OF THE DRAWINGS

The present invention will be explained in detail with regard to the accompanying drawings in which.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Moreover, it has to be understood that in the present disclosure, the terms "top", "bottom", "up", "down", "front", "back", etc., must be interpreted with reference to the enclosed set of figures. However, it has to be understood that there is no preferred orientation of the dual interface electronic module and/or the smart card according to the present invention.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. The scope of the present disclosure is defined in the appended set of claims. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated. Finally, those fields considered known to the skilled person will not be described to avoid covering in a useless way the described invention.

Figure 1:
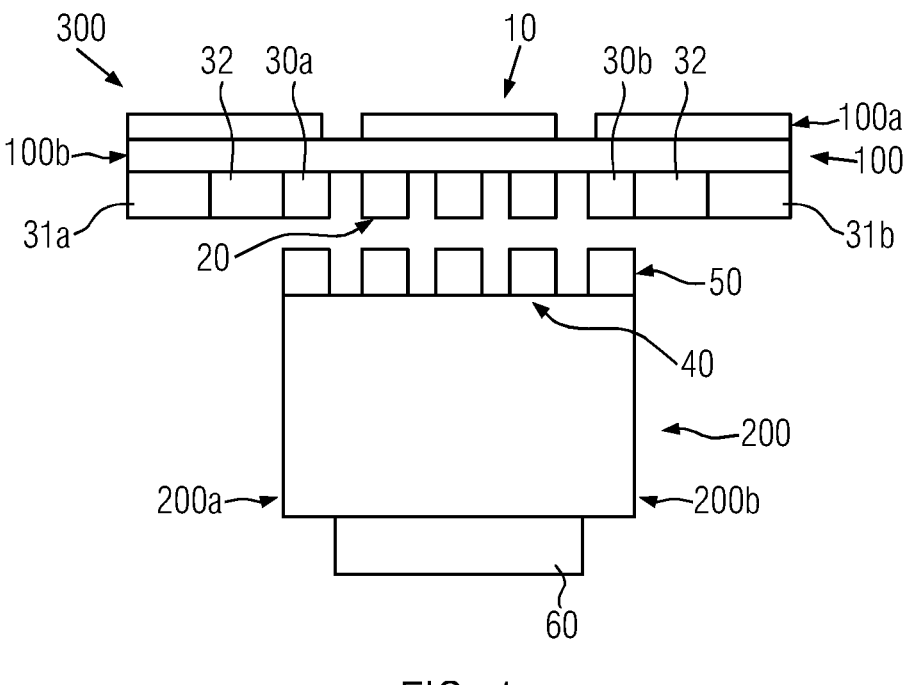
FIG. 1 schematically shows a cross-section of a dual interface electronic module prior to assembly, in accordance with some illustrative embodiments of the present disclosure.

FIG. 1 illustrates a cross section of the dual interface electronic module 300 for a smart card prior to assembly, in accordance with the preferred embodiment of the present invention.

The dual interface electronic module 300 comprises a contact plate 100 to be connected to a multilayered PCB 200. For example, the contact plate 100 may conform to the specifications of an ISO 7816 contact plate. However, it has to be understood that other types of contact plates 100 conforming to other standards may also be used for the purposes of the present invention.

The contact plate 100 has a first top side 100a and a second bottom side 100b. On the top side 100a, a plurality of contact pads 10 are formed; the contact pads 10 may be connected to external electrical devices, for instance when the dual interface electronic module is part of a smart card used in contact mode. Even if three contact pads are schematically illustrated in FIG. 1, it has to be understood that any numbers of contact pads may be formed, for instance one, two, four, five or more.

On the bottom side 100b of the contact plate 100, a plurality of electrical connectors or interconnects 20 is provided for connecting the contact plate 100 to the electronic components 40 of the multilayered PCB 200. Even if three electrical connectors 20 are illustrated in FIG. 1, it has to be understood that any number of electrical connectors may be formed on the contact plate 100, for instance one, two, four, five or more, without affecting the purpose of the present invention.

The contact plate 100 is connected to the multilayered PCB via the electrical connectors 20 placed on the second, bottom side 100b of the contact plate 100 and via the electrical connectors 40 formed on the top side 200a of the multilayered PCB 200. Moreover, the top side 200a of the multilayered PCB 200 comprises two interconnects 50 to be connected to the corresponding antenna electrical interconnect 30a, 30b of the contact plate, as it will be described in the following. On the bottom side 200b of the multilayered PCB, a value add component, for instance a display 60, may be located. The display 60 may be, for instance, a display for a dynamic card verification value (DCVV). The display 60 may be connected to the integrated circuit chips included in the multilayered PCB. The electronic display 60 might be replaced with a different value-add component, such as a finger print sensor, LED, an electronic or mechanical button.

Figure 2:
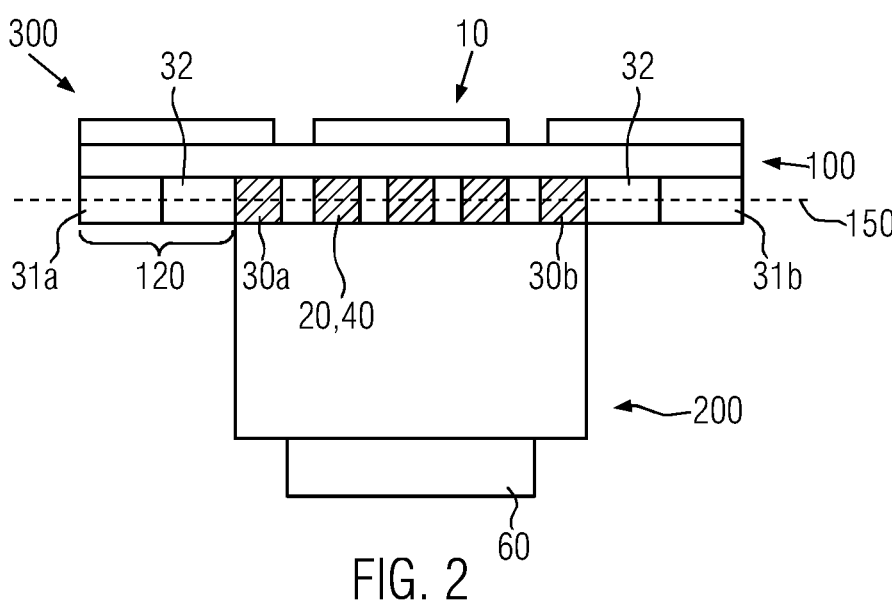
FIG. 2 schematically shows a cross-section of a dual interface electronic module in the assembled state, in accordance with some illustrative embodiments of the present disclosure.

FIG. 2 schematically illustrates a cross section of the dual interface electronic module 300 in the assembled configuration, in accordance with the preferred embodiment of the present invention. In FIG. 2, it can be seen that the contact plate 100 and the multilayered PCB 200 are connected in correspondence with the interconnection plate 150. The contact plate 100 and the multilayered PCB 200 are joined so that the electrical connectors 20 on the contact plate 100 are electrically coupled to the corresponding electrical connectors 40 on the multilayered PCB 200 and the antenna electrical interconnects 30a, 30b are connected to the corresponding terminals 40 of the PCB 200. A conductive material, for instance, an electrical paste, a conductive glue and/or a solder may be used to electrically couple the electrical connectors 20 and 40, respectively, to reduce the contact resistance, repel moisture, inhibit corrosion and prevents static build up. Other coupling techniques may be also used.

As shown in FIG. 2, the contact plate 100 protrudes from both sides of the multilayered PCB 200, so as to define an excess portion 120. The dual interface electronic module 300 shown in FIG. 2 has an essentially T-shaped cross section, wherein the two arms of the T-shape profile are formed by the excess portion 120. According to an alternative embodiment of the present invention, the contact plate 100 may be configured so as to protrude from the multilayered PCB 200 only from a side, for instance, from the right side or from the left side of the PCB 200 with reference to FIG. 2. In this case, the excess portion would be reduced.

On each protruding portion of the excess portion 120 of the contact plate 100, an antenna pad 31a, 31b is placed, to provide an electrical connection between the dual interface electronic module 300 and an antenna, for instance, an antenna of a smart card. In the configuration shown in FIG. 2, the two antenna pads 31a, 31b are located on the bottom layer 100b of the contact plate 100, so as to facilitate the connection with the antenna. Each antenna pad 31a, 31b is electrically connected through an electrical track 32 to a corresponding antenna interconnect 30a, 30b.

Figure 3A:
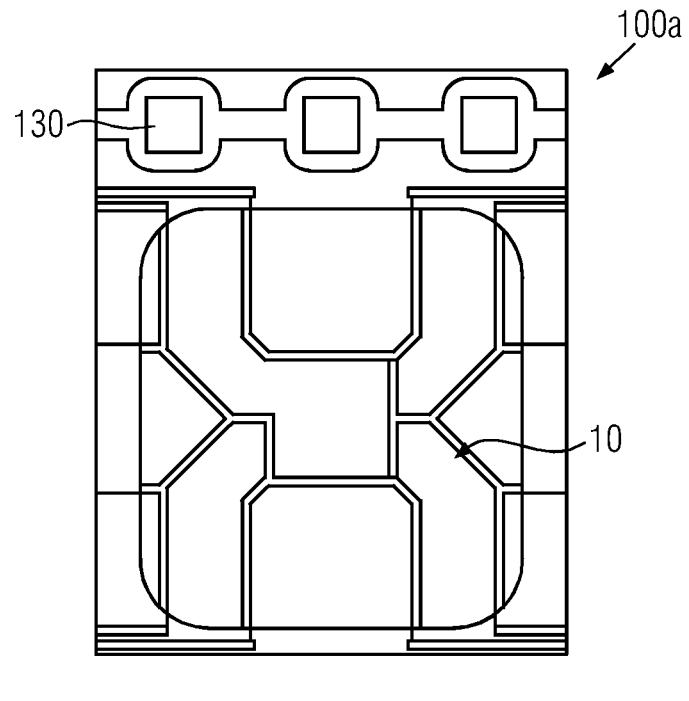
FIG. 3A schematically shows a top view of a first side of the contact plate in accordance with some illustrative embodiments of the present disclosure.

FIG. 3A illustrates a top view of the top side 100a of the contact plate 100. The top side 100a of the contact plate 100 also coincides with the top side of the dual interface electronic module 300. The other electronic components of the dual interface electronic module 300 do not extend beyond the area of the contact plate 100. The top side 100a of the contact plate 100 comprises contact pads 10 for providing an external connection between the dual interface electronic module and an external electronic device during contact-mode operation. The contact plate 100 illustrated in FIG. 3A conforms to the specification of an ISO 7816 contact plate, which comprises five pins 20 for electric connection.

Figure 3B:
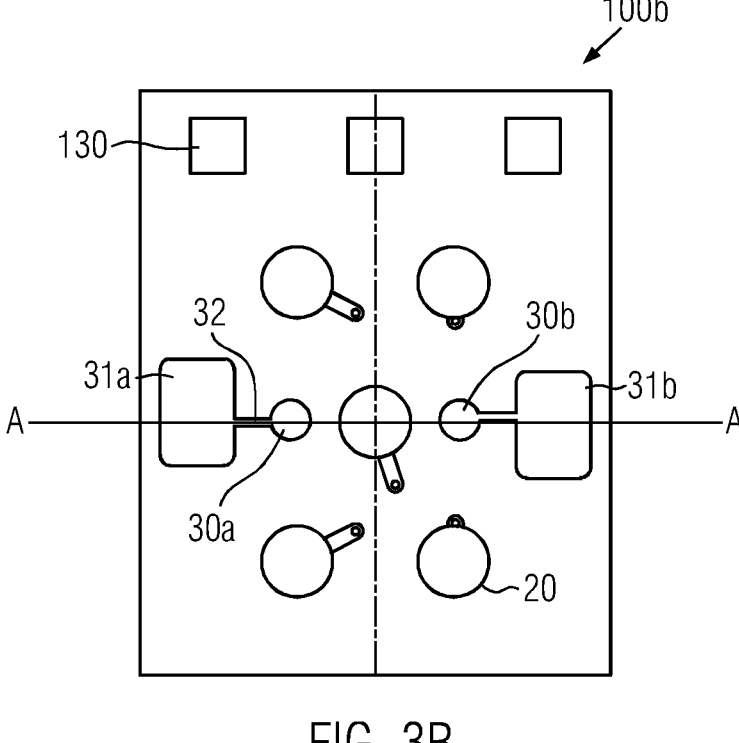
FIG. 3B schematically shows a top view of a second side of the contact plate in accordance with some illustrative embodiments of the present disclosure.

FIG. 3B illustrates a top view of the bottom side 100b of the contact plate 100. The bottom side 100b of the contact plate 100 further comprises two antenna pads 31a and 31b, each one connected with the corresponding antenna electrical interconnect 30a, 30b via the electrical track 32. The antenna electrical interconnects 30a, 30b and the antenna pads 31a, 31b are symmetrically disposed on the bottom side 100b on the contact plate 100 with respect to an axis of the contact plate 100. According to the configuration shown in FIG. 3B, the contact plate 100 may have the size of a normal five pins or eight pins ISO contact plate as defined in a standard.

Figure 3C:
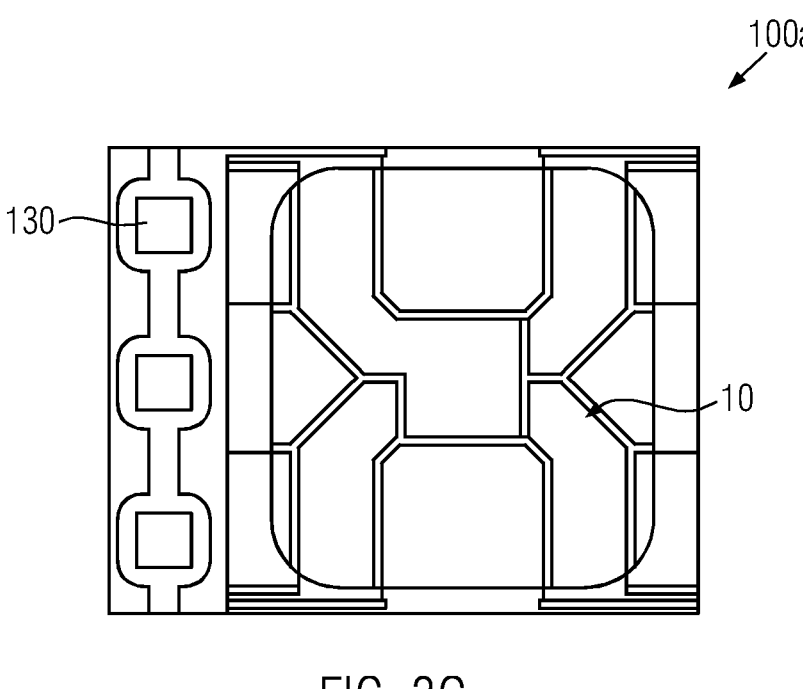
FIG. 3C schematically shows a top view of a first side of the contact plate in accordance with some alternative illustrative embodiments of the present disclosure.
Figure 3D:
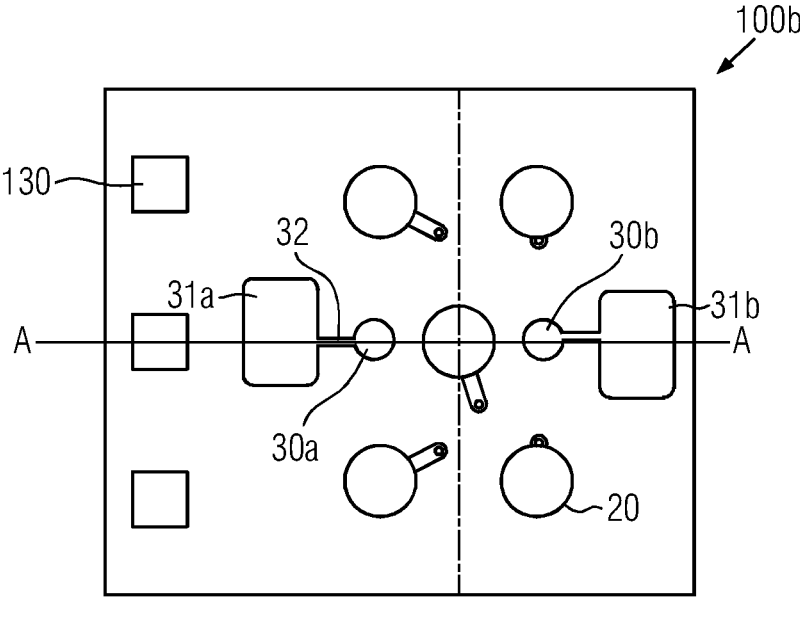
FIG. 3D schematically shows a top view of a second side of the contact plate in accordance with some alternative illustrative embodiments of the present disclosure.

FIGS. 3C and 3D illustrate a top view of the top side 100a and a top view of the bottom side 100b of the contact plate 100, respectively, according to an alternative configuration.

The surface of the contact plate 100 shown in FIGS. 3C and 3D is larger than the surface of a normal five pins or eight pins ISO contact plate as defined in a standard. In the contact plate 100 illustrated in FIGS. 3C and 3D, the configuration of the contact pads 10 is turned by 90° with respect to the contact plate 100 shown in FIGS. 3A and 3B, as it can be seen from the different position of the tracking holes 130 of the tape used for producing the contact plates 100.

This configuration of the contact plate 100 comprising the antenna pads 31a, 31b on its backside is advantageous because the process of connecting the antenna of a smart card to the corresponding antenna parts is simplified in this way. In fact, the present configuration provides more freedom in the positioning of the antenna pads 31a, 31b and the antenna interconnects 30a, 30b in proximity of the interconnects 20. The position of the contact pads 10 is fixed by predefined standards, such as ISO standards, and it represents a constraint in the positioning of the electronic module 300 in a card body of a smart card, as described below. In fact, a wrong positioning of the contact pads 10 would imply a malfunctioning of the electronic module 300. Accordingly, it is important to offer an increased freedom in the positioning of the antenna pads 31a, 31b, in order to ensure a correct connection to the terminals of the antenna, without affecting the position of the contact pads 10 on the contact plate 100.

Figures 4, 5:
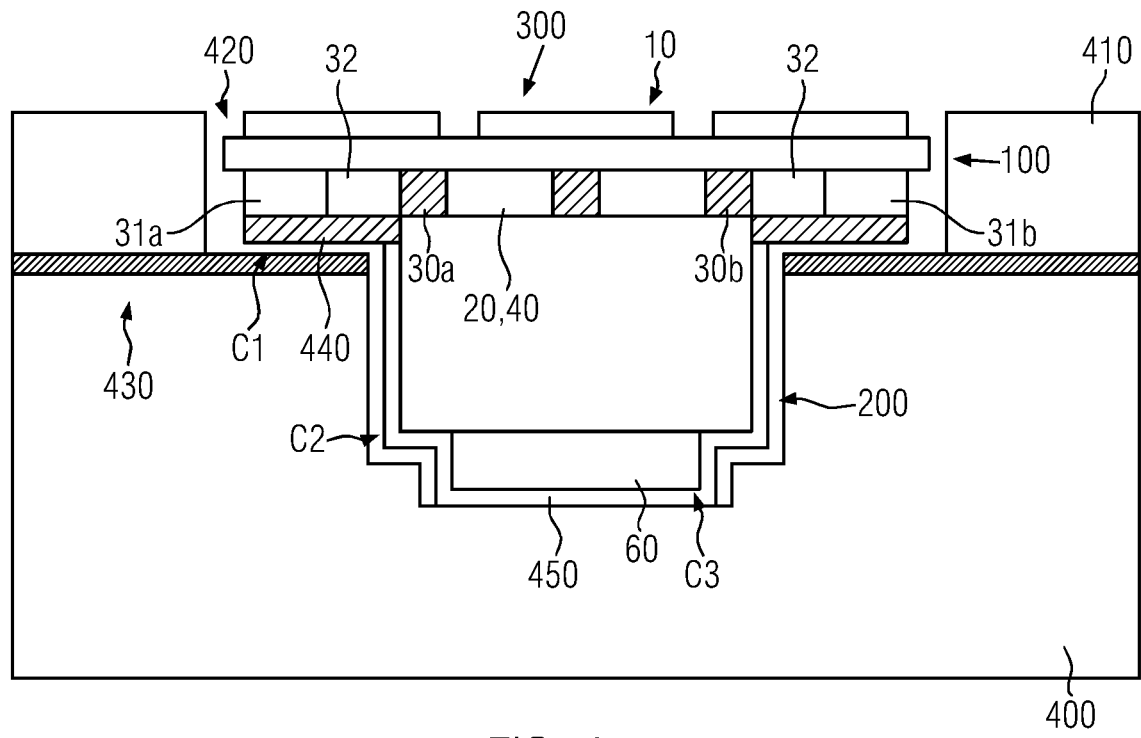
FIG. 4 schematically shows a cross-section along axis A-A of FIG. 3B of a smart card comprising a dual interface electronic module accommodate in a cavity, in accordance with some illustrative embodiments of the present disclosure.
FIG. 5 schematically shows a cross-section along axis A-A of FIG. 3B of a smart card comprising a dual interface electronic module accommodate in a cavity, in accordance with some illustrative embodiments of the present disclosure.

FIG. 4 schematically illustrates a cross sectional view of a smart card 400 provided with a dual interface electronic module 300, according to a preferred embodiment of the present invention.

The smart card 400 comprises a card body 410 including a plurality of plastic card layers and a card antenna 430. A cavity 420 is formed in the card body 410 of the smart card 400, wherein the shape or profile of the cavity 420 matches the shape or profile of the dual interface electronic module 300 inserted in the card. The cavity 420 of the smart card shown in FIG. 4 is formed by a first cavity C1, a second cavity C2, and a third cavity C3. For instance, the cavity 420 may be formed by milling the card 400 from the front towards the back of the card so as to obtain a blind hole cavity.

The dual interface electronic module 300 may be inserted in the cavity 420 from the top of the card and it may be covered by a suitable adhesive material. Preferably, two different adhesive materials may be used for covering the dual interface electronic module in the smart card 400. For instance, a first adhesive material having conductive properties may be used for covering the contact plate 100 and fixing it to the first cavity C1; a second adhesive material may be used for covering the contact plate 100 and fixing it to the second and third cavities C2, C3.

A first adhesive material 440 may comprise an ACF material suitable for providing both a mechanical and an electrical connection between the antenna pads 31a, 31b and the antenna 430 of the smart card 400. The ACF material may fill the gap between the first cavity C1 and the excess portion 120 of the contact plate 100.

A second adhesive material 450 may be provided on the bottom of the second and third cavities C2, C3 for covering the multilayered PCB 200. Advantageously, the second adhesive material 450 may be a transparent adhesive material, so that the material does not prevent the display 60 of the multilayered PCB to be visible from the bottom of the smart card 400. The second adhesive material 450 may advantageously fix the multilayered PCB 200 to the surface of the second and third cavities C2, C3. The second adhesive material 450 may fill, completely or partially, the gap between the multilayered PCB 200 comprising the display 60 and the second and third cavities C2, C3.

According to an alternative configuration, the second adhesive material 450 may be used only to cover the display 60 and to fix it to the third cavity C3, while ensuring its visibility from the back of the card 400.

The surface of the excess portion 120 protruding from the multilayered PCB 200 is substantially flat, so that the process of fixing it to the first cavity C1 with the first adhesive material 440 is performed in an easy and efficient way and a stable connection between the antenna pads 31a, 31b and the antenna 430 is realized.

FIG. 5 illustrates an alternative embodiment of the present invention, wherein the area of the antenna pads 31a, 31b is covered by the first adhesive material 450 having conductive properties, so that the antenna pads 31a, 31b are electrically connected to the antenna 430. The remaining surface of the dual interface electronic module 300 (except for the antenna pads 31a, 31b) may be covered by a third adhesive material 460, for example a hot melt layer. The third adhesive material may be cut so that the area of the antenna pads 31a, 31b is free from the third adhesive layer. The third adhesive material 460 may be transparent, so that the display 60 can be visible on the back side of the dual interface electronic module 300, and it can further fix the electronic module 300 to the second and third cavities C2, C3 of the card body. The third adhesive material 460 may fill, completely or partially, the gap between the multilayered PCB 200 comprising the display 60 and the second and third cavities C2, C3.

Once the dual interface electronic module 300 is inserted into the corresponding cavity 420 of the smart card 400, an electrical connection is provided between the antenna pads 31*a*, 31*b* and the antenna 430. This electrical connection might be easily obtained, because the antenna part 31*a*, 31*b* are exposed on the protruding excess portion 120 of the contact plate 100 and because a layer of conductive material is provided between the antenna pads 31*a*, 31*b* and the antenna 430.

To the contrary, at the state of the art, the antenna connectors are usually located at the bottom of the dual interface electronic module, next to the display. According to the methods of the state of the art, therefore, it is difficult to establish an electrical connection between the antenna of the smart card and the antenna pads, because it is necessary to guarantee a stable electrical connection through all the layers of the multilayered PCB, in order to reach the antenna of the smart card. Moreover, according to the methods known in the state of the art, it is difficult to control the position of the antenna connectors placed at the bottom of the electronic module, because the main constrain in the positioning of the module inside the smart card is that of ensuring correct positioning of the contact pads, for instance ISO contact pads. This is even more difficult due to the non-idealities (e.g. limited sensitivity) of the experimental tools used to form the smart card. When the dual interface electronic module is inserted from the top of the smart card into the cavity, there is little control of the precise positioning of the module along the other directions perpendicular to the insertion direction. However, according to the present invention, since the antenna pads 31*a*, 31*b* are located on the uppermost available level of the dual interface electronic module 300, it is easier to control and to adjust the position of the antenna pads 31*a*, 31*b* on the module 300 along the direction perpendicular to the insertion direction and thus to provide a reliable connection with the antenna 430.

The smart card 400 of FIGS. 4 and 5 may be a dual interface smart card for operation in contact-mode and in contactless-mode.

Figure 6:
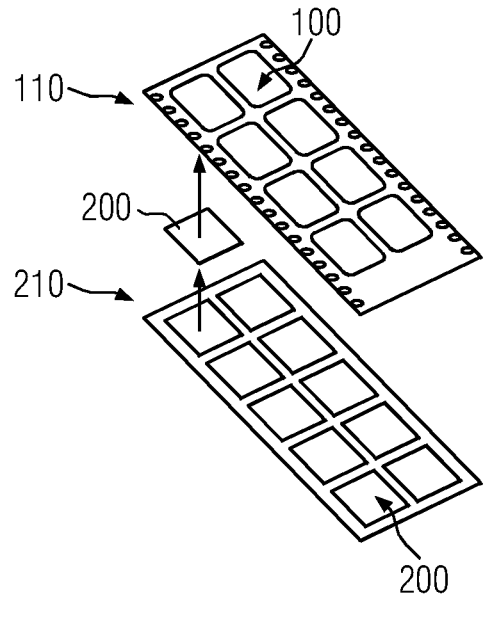
FIG. 6 schematically shows a step of the method for forming a dual interface electronic module in accordance with some illustrative embodiments of the present disclosure.

FIG. 6 schematically illustrates a step of the process of the formation of the dual interface electronic module 300 according to the preferred embodiment of the present invention.

The dual interface electronic module 300 is preferably formed by means of a reel-to-reel process. Accordingly, a first tape 110 comprising a plurality of contact plates 100 is formed and a sheet 210 comprising a plurality of multilayered PCBs 200 is also provided. The plurality of contact plates 100 may be formed on the first tape 110 so as to be disposed along a plurality of columns and/or a plurality of rows. In a similar way, the plurality of multilayered PCBs 200 on the sheet 210 may be formed so as to be disposed along a plurality of rows and/or columns.

The plurality of multilayered PCBs 200 are cut out from the sheet 210 so as to obtain a plurality of single PCBs 200. The single PCBs are then transferred on the first tape 110 in a discrete way with a "pick and place" solution and they are assembled with the corresponding contact plates 100 of the first tape 110, so as to form the corresponding dual interface electronic modules 300. The assembled product forms a reel-to-reel second tape, wherein the first tape 110 acts as a carrier tape.

Each dual interface electronic module 300 is then punched out from the second tape, so as to obtain a single dual interface electronic module 300. Since the first area of the contact plate 100 is larger than the second area of the multilayered PCB 200, the process of punching out the dual interface electronic modules 300 might be easily performed by punching out the corresponding contact plates 100. Accordingly, the risk of damaging the PCB is reduced.

Figure 7:
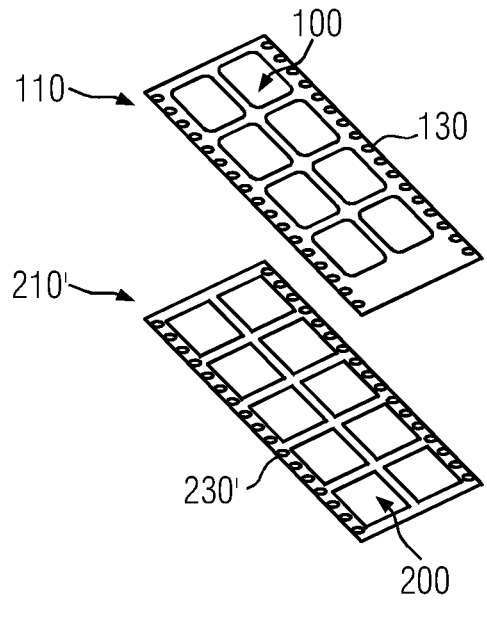
FIG. 7 schematically shows a step of the method for forming a dual interface electronic module in accordance with some alternative illustrative embodiments of the present disclosure.

FIG. 7 schematically illustrates a step of the process of the formation of the dual interface electronic module 300 according to an alternative embodiment of the present invention.

The dual interface electronic module 300 is preferably formed by means of a reel-to-reel process. Accordingly, a first tape 110 comprising a plurality of contact plates 100 is formed and a third tape 210' comprising a plurality of multilayered PCBs 200 is also provided. The plurality of contact plates 100 may be formed on the first tape 110 so as to be disposed along a plurality of columns and/or a plurality of rows. In a similar way, the plurality of multilayered PCBs 200 on the third tape 210' may be formed so as to be disposed along a plurality of rows and/or columns. During the assembly step, the first tape 110 is aligned and electrically coupled to the third tape 210'. The tracking holes 130, 230' may be advantageously employed to align the two tapes.

In this way, a corresponding fourth "reel-to-reel" tape with a plurality of dual interface electronic module 300 is formed. Since the first area of the contact plate 100 is larger than the second area of the multilayered PCB 200, the outline of the multilayered PCB 200 in correspondence of the excess portion 120 of the contact plate 100 must be removed from the third tape 210', so as to form the excess portion 120 in each electronic module 300. For instance, the outline of the multilayered PCB 200 can be removed by means of laser cutting, milling and the like.

Finally, each dual interface electronic module 300 is punched out from the fourth tape, so as to obtain a single dual interface electronic module 300.

LIST OF REFERENCES

10: contact pads
20: electrical connectors
30*a*, 30*b*: antenna electrical interconnect
31*a*, 31*b*: antenna pads
32: electrical track
40: electrical connectors on the multilayered PCB
50: antenna electrical connectors on the multilayered PCB
60: display
100: contact plate
100*a*: first side of the ISO connection plate
100*b*: second side of the ISO connection plate
110: first tape
120: excess portion
130: tracking holes
150: interconnection interface
200: multilayered PCB
200*a*: first side of the multilayered PCB
200*b*: second side of the multilayered PCB
210: sheet
210': third tape
230': tracking holes
320': tracking holes
300: dual interface display module
400: smart card
410: card body
420: cavity
430: antenna
440: first adhesive material
450: second adhesive material
460: third adhesive material

The invention claimed is:

1. A dual interface smart card comprising:

a card body including an antenna, and a dual interface electronic module for a smart card, said dual interface electronic module comprising a contact plate for external connection, said contact plate including at least one antenna electrical connector, and a multilayered PCB including a value-add component, wherein the value-add component is a display;

wherein said contact plate and said multilayered PCB are connected together by means of a plurality of interconnects at an interconnection interface, wherein said contact plate has a first area in correspondence of said interconnection interface and said multilayered PCB has a second area in correspondence of said interconnection interface, wherein said first area is larger than said second area, so as to define an excess portion, wherein said contact plate comprises two or four antenna electrical connectors, which are symmetrically distributed on said excess portion so as to be exposed for being electrically connected to a corresponding antenna of said smart card, wherein said card body comprises a cavity for accommodating said dual interface electronic module and said cavity has a cross-section configured to match the cross-section of said dual interface electronic module, so as to accommodate said contact plate protruding from said multilayered PCB, and wherein said antenna is electrically connected to said antenna electrical connectors.

2. The dual interface smart card according to claim 1, wherein said first area has a first width and a first length and said second area has a second width and a second length and at least one of the following conditions is satisfied:

said first width is greater than said second width, and/or said first length is greater than said second length, so as to define said excess portion.

3. The dual interface smart card according to claim 1, wherein said contact plate conforms to the specifications of an ISO 7816 contact plate.

4. The dual interface smart card according to claim 1, wherein said excess portion of said dual interface electronic module comprises a protruding, flat surface to be accommodated into said cavity having a T-shaped cross-section.

5. The dual interface smart card according to claim 1, wherein said dual interface electronic module is at least partially covered by a first adhesive material having conductive properties, for instance an Anisotropic Film Connection (ACF) material, for electrically connecting said antenna and said at least one antenna electrical connector.

6. The dual interface smart card according to claim 1, wherein said dual interface electronic module is at least partially covered by a second adhesive material for connecting said value-add component and said card body, and said second adhesive material is transparent, so that said value-add component is visible from at least one side of said smart card.

7. A method for fabricating a dual interface smart card, said method comprising the following steps:

providing a contact plate for external connection;

providing a multilayered PCB including a value-add component, wherein the value-add component is a display;

connecting said contact plate and said multilayered PCB in correspondence of an interconnection interface comprising a plurality of interconnects, wherein said contact plate has a first area in correspondence of said interconnection interface and said multilayered PCB has a second area in correspondence of said interconnection interface;

wherein said first area is larger than said second area, so as to define an excess portion; and wherein said contact plate comprises two or four antenna electrical connectors which are symmetrically distributed on said excess portion so as to be exposed for being electrically connected to a corresponding antenna of the smart card;

providing a card body of a smart card comprising a cavity and an antenna, said cavity having a cross-section configured to match the cross-section of said dual interface electronic module, so as to accommodate said contact plate protruding from said multilayered PCB;

inserting said dual interface electronic module into said cavity; and electrically connecting said antenna to said antenna electrical connectors.

8. The method according to claim 7, comprising the step of providing said contact plate having said first area with a first width and a first length, and providing said multilayered PCB having said second area with a second width and a second length, wherein at least one of the following conditions is satisfied:

said first width is greater than said second width, and/or said first length is greater than said second length, so as to define said excess portion.

9. The method according to claim 7, wherein a plurality of contact plates are formed on a first tape and a plurality of multilayered PCBs are formed on a sheet, and said plurality of multilayered PCBs are cut out from said sheet so as to obtain a plurality of single PCBs and said single PCBs are mounted and electrically coupled to said plurality of corresponding contact plates on said first tape, so as to form a second tape including a plurality of corresponding dual interface electronic modules.

10. The method according to claim 7, wherein said method comprises a reel-to-reel process, wherein a plurality of contact plates are formed on a first tape and a plurality of multilayered PCBs are formed on a third tape, and said first tape is aligned and electrically coupled to said third tape so as to form a fourth tape including a plurality of corresponding dual interface electronic modules.

11. The method according to claim 7, further comprising the step of providing said dual interface electronic module with a first adhesive material having conductive properties, for instance an Anisotropic Connection Film (ACF) material, for electrically connecting said at least one portion of said at least one antenna electrical connector to said antenna.

12. The method according to claim 7, further comprising the step of providing said dual interface electronic module with a conductive material, for instance TE-connect, solder, flex bump, for electrically connecting said at least one portion of said at least one antenna electrical connector to said antenna.

13. The method according to claim 7, further comprising the step of providing said dual interface electronic module with a second adhesive material, said second material being transparent for allowing to view said value-add component from at least one side of said smart card through said second adhesive material.

14. The method according to claim 7, further comprising the step of providing said dual interface electronic module with a third adhesive material not having conductive properties, wherein said first adhesive material covers said at least one portion of said at least one antenna electrical connector and said third adhesive material covers the remaining part of said excess portion and is provided with openings in correspondence of said at least one antenna electrical connector covered by said first adhesive material.

15. The method according to claim 14, wherein said third adhesive material is further configured to cover the exposed portion of said multilayered PCB.

\* \* \* \* \*